US009742528B2

(12) United States Patent
Rune et al.

(10) Patent No.: US 9,742,528 B2
(45) Date of Patent: Aug. 22, 2017

(54) METHOD AND ARRANGEMENT FOR REDUCING THE AMOUNT OF MESSAGES SENT IN A COMMUNICATION NETWORK

(71) Applicant: TELEFONAKTIEBOLAGET L M ERICSSON (PUBL), Stockholm (SE)

(72) Inventors: Göran Rune, Linköping (SE); Pontus Wallentin, Linköping (SE); Gunnar Mildh, Sollentuna (SE); Anders Henriksson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/162,853

(22) Filed: May 24, 2016

(65) Prior Publication Data

US 2016/0329992 A1 Nov. 10, 2016

Related U.S. Application Data

(63) Continuation of application No. 12/302,989, filed as application No. PCT/SE2006/000636 on May 30, 2006, now abandoned.

(51) Int. Cl.
| | |
|---|---|
| *H04L 1/16* | (2006.01) |
| *H04B 7/26* | (2006.01) |
| *H04W 28/06* | (2009.01) |
| *H04L 29/06* | (2006.01) |
| *H04L 29/08* | (2006.01) |
| *H04W 92/04* | (2009.01) |
| *H04W 92/10* | (2009.01) |
| *H04W 92/14* | (2009.01) |

(52) U.S. Cl.
CPC ......... *H04L 1/1664* (2013.01); *H04B 7/2628* (2013.01); *H04L 69/04* (2013.01); *H04L 69/321* (2013.01); *H04W 28/06* (2013.01); *H04B 2201/70724* (2013.01); *H04W 92/045* (2013.01); *H04W 92/10* (2013.01); *H04W 92/14* (2013.01)

(58) Field of Classification Search
CPC ...... H04W 28/06; H04L 69/04; H04L 69/321; H04L 1/1604; H04L 1/1664
See application file for complete search history.

(56) References Cited

U.S. PATENT DOCUMENTS

| | | | |
|---|---|---|---|
| 6,636,528 B1 | 10/2003 | Korpi et al. | |
| 7,596,121 B2 | 9/2009 | De Jong et al. | |
| 2002/0044552 A1 | 4/2002 | Vialen et al. | |
| 2004/0068571 A1 | 4/2004 | Ahmavaara | |
| 2006/0092871 A1 | 5/2006 | Nishibayashi et al. | |

FOREIGN PATENT DOCUMENTS

EP    1 067 744 A1    1/2001

*Primary Examiner* — Gbemileke J Onamuti

(57) ABSTRACT

The invention relates to a method and an arrangement for reducing the amount of messages sent in a communication network comprising a first communication network entity, a second communication network entity connected to said first communication network entity over a communication interface and one or more user equipments connected to said second communication network entity over a radio interface, whereby messages are sent on said interfaces using at least a first and a second protocol. General rules are provided for sending first protocol messages packed inside second protocol messages, so called "piggybacking", and each first protocol message is provided with an instruction field defining a co-ordination of procedure steps to be taken for performing an action.

16 Claims, 4 Drawing Sheets

METHOD AND ARRANGEMENT FOR REDUCING THE AMOUNT OF MESSAGES SENT IN A COMMUNICATION NETWORK

RELATED APPLICATIONS

This application is a continuation of co-pending U.S. patent application Ser. No. 12/302,989 filed Apr. 3, 2009, which was the National Stage of International Application No. PCT/SE2006/000636, filed May 30, 2006, the disclosures of which are incorporated herein by reference in their entireties.

TECHNICAL FIELD

The present invention relates to a method and an arrangement in a communication system and, particularly, to an arrangement allowing for reducing the amount of messages sent in a communication network as well as a method for such reduction. The invention further relates to a computer-readable medium containing computer program for reducing the amount of messages sent in a communication network.

BACKGROUND OF THE INVENTION

Currently in the Third Generation Partnership Project (3GPP) specifications of UMTS, the signalling protocols used between the network and the User Equipment (terminal) is divided into Access Stratum (AS) and Non-Access Stratum (NAS) protocols. The Non-Access Stratum protocols (e.g. Session Management (SM), Mobility management (MM), SMS) are terminated in the terminal (UE) and Core network (CN) and are sent transparently via the Radio Access Network (RAN). The Access Stratum protocols (e.g. Radio Resource Control (RRC), Radio Link Control (RLC), Medium Access Control (MAC)) are terminated in the UE and RAN, and are not visible in the CN. Additionally there are Iu signalling between the RAN and CN which is not visible to the UE.

Due to the separation of the Non-Access Stratum and the Access Stratum protocols there is a lot of handshaking between the network and the UE to establish a service.

Since there is a clear split between Access Stratum (AS) and Non-Access Stratum (NAS) functions it is not possible to co-ordinate AS and NAS procedures in an efficient way. This leads to that a typical UMTS procedure e.g. "service activation" involves many message exchanged over the radio interface, causing significant delay to the execution of the procedure.

In most practical situations, there is a need for transmitting data in both directions. One way of achieving full-duplex data transmission would be to have two separate communication channels, and use each one for simplex data traffic (in different directions). If this were done, we would have two separate physical circuits, each with a "forward" channel (for data) and a "reverse" channel (for acknowledgment). In both cases the bandwidth of the reverse channel would be almost entirely wasted. In effect, the user would be paying the cost of two circuits but only using the capacity of one.

A better idea is to use the same circuit for data in both directions. In this model the data frames from A to B are intermixed with the acknowledgment frames from A to B. By looking at the "kind" field in the header of an incoming frame, the receiver can tell whether the frame is data or acknowledgment.

Although interweaving data and control frames on the same circuit is an improvement over having two separate physical circuits, yet another improvement is possible. When a data frame arrives, instead of immediately sending a separate control frame, the receiver restrains itself and waits until the network layer passes it the next packet. The acknowledgment is attached to the outgoing data frame. In effect, the acknowledgment gets a free ride on the next outgoing data frame. The technique of temporarily delaying outgoing acknowledgment so that they can be hooked onto the next outgoing data frame is widely known as piggybacking.

In the recent development of Long Term Evolution and System Architecture Evolution within 3GPP the possibility of piggybacking NAS protocol messages into AS protocol messages has been discussed to enable less hand-shaking between the network and the UE.

The problem with the existing solution is that although piggybacking of NAS protocol messages into AS protocol messages potentially would reduce the amount of signalling between the network and the UE it would require a significant effort in defining the co-ordinated behaviour expected in the UE for all possible (or all allowed) combinations of NAS protocol messages and AS protocol messages. This problem would in practice make piggybacking difficult to achieve.

SUMMARY OF THE INVENTION

Accordingly, it is an objective with the present invention to provide an improved method for reducing the amount of messages sent in a communication network comprising a first communication network entity, a second communication network entity connected to said first communication network entity over a communication interface and one or more user equipments connected to said second communication network entity over a radio interface, whereby messages are sent on said interfaces using at least a first and a second protocol.

A further objective with the present invention is to provide an improved arrangement for reducing the amount of messages sent in a communication network comprising a first communication network entity, a second communication network entity connected to said first communication network entity over a communication interface and one or more user equipments connected to said second communication network entity over a radio interface, whereby messages are sent on said interfaces using at least a first and a second protocol.

A still further objective with the present invention is to provide an improved computer-readable medium containing computer programs for reducing the amount of messages sent in a communication network comprising a first communication network entity, a second communication network entity connected to said first communication network entity over a communication interface and one or more user equipments connected to said second communication network entity over a radio interface, whereby messages are sent on said interfaces using at least a first and a second protocol.

Thanks to the provision of general rules defining what type of co-ordination of the NAS and AS procedures invoked by the NAS and AS protocol messages respectively, the benefits of piggy-backing can be fully explored. I.e. the possibilities to reduce the procedure delay will be enabled. The reduced delay is achieved by having less handshaking over the radio interface creating less transmission delay and by enabling parallel processing of messages in the UE and in the network nodes.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

Figure 1:
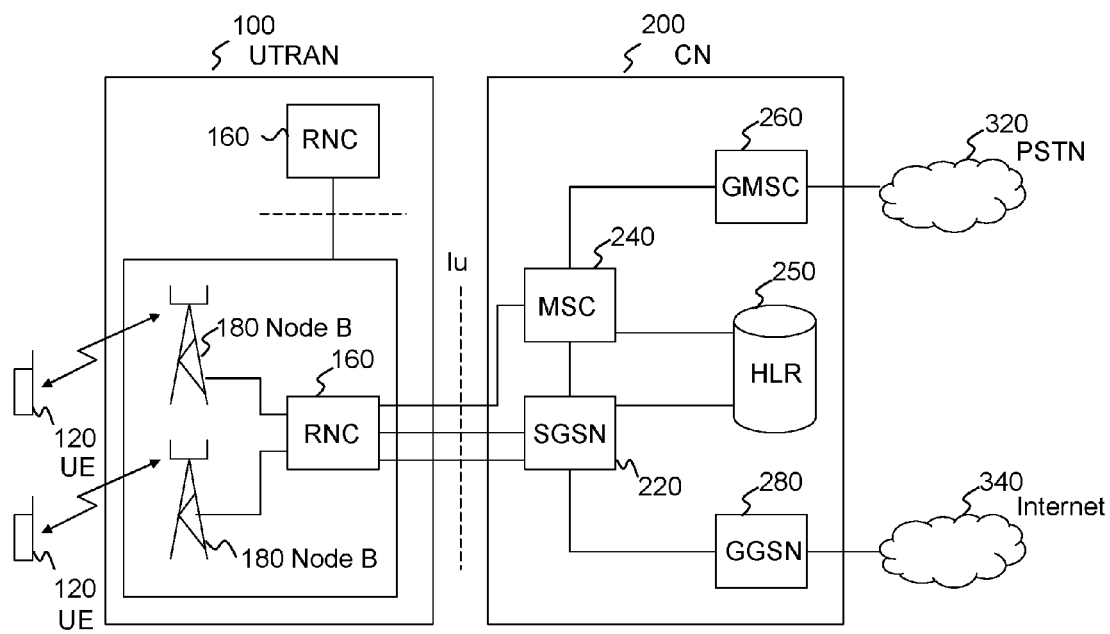
FIG. 1 is an exemplary block diagram of a mobile communication network.

A block diagram of an exemplary 3GPP UMTS system network is shown in FIG. 1. The network comprises a radio access network (RAN), which in the preferred embodiment of the present invention is a UMTS Terrestrial Radio Access Network (UTRAN) 100 and a core network (CN) 200. The UTRAN 100 and the CN 200 provide communication and control for a plurality of user equipments (UE) 120.

The UTRAN architecture 100 comprises a plurality of Radio Network Controllers (RNC) 160 which is connected to a set of Node Bs 180. The Node Bs 180 comprise the antennas, RF equipment and baseband processing circuits needed to communicate with the UEs 120. The Node Bs 180 are connected to the RNC 160 through the Iub-interface.

The core network 200 typically comprises at least one Serving GPRS Support Node (SGSN) 220, one or more Gateway GPRS Support Node (GGSN) 280, at least one mobile switching center (MSC) 240, which may include a visitor location register (VLR) (not shown in FIG. 1), a Gateway MSC (GMSC) 260, and a GPRS home location register (HLR) 250. The CN 200 provides both circuit-switched and packet data communication with various external networks, typically including the Public Switched Telephone Network (PSTN) 320 and one or more packet mode communication network, such as the Internet 340. The UTRAN 100 connects to the CN 200 through the Iu interface.

In recent developments of 3GPP an evolved system architecture has been presented, with several new reference points, such as the S1-interface between the core network and radio access network for transport of user plane and control plane traffic. The S1-interface corresponds to the Iu-interface. These new developments is called LTE/SAE in 3GPP, where LTE is Long Term Evolution of 3G RAN and SAE is system architecture evolution, i.e. a development of the core network. Further, a new radio interface between the RAN and the UEs, corresponding to the Uu-interface, will be introduced. In this context this new radio interface is called LTE radio interface. The person skilled in the art realizes that the present invention works very well on these new developments as well.

Figure 2:
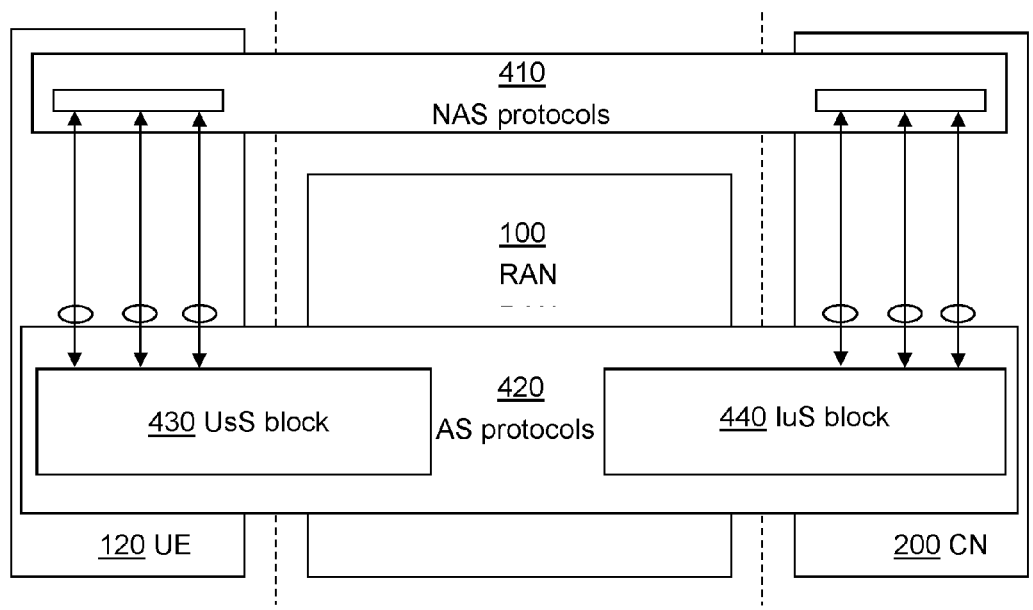
FIG. 2 is a block diagram of the mobile communication network showing two signalling protocols.

FIG. 2 shows the communication network including the UE 120, the RAN 100 and the CN 200. The signalling protocols are divided into access stratum (AS) protocols 420 and non access stratum (NAS) protocols 410. The NAS-protocols 410 are terminated in the UE 120 and the core network 200 and are sent transparently via the RAN 100. The AS-protocols 420 are terminated in the UE 120 and the RAN 100, shown as a Uu Stratum (UuS) block 430 and are not visible in the CN 200. Further there are signalling between the RAN 100 and the CN 200, shown as a Iu stratum (IuS) block 440, which is not visible to the UE 120. The access stratum 420 offers services through three Service Access Points (SAPs) to the non access stratum 410, which are shown in FIG. 2 as three circles on the arrows from the UuS 430 and the IuS 440 respectively to the NAS 410.

Figure 3:
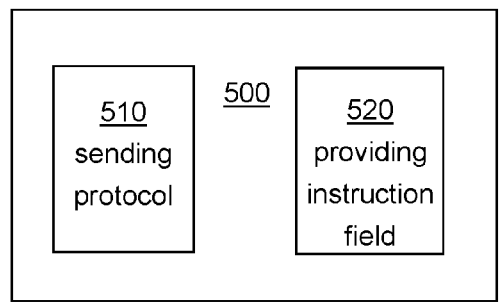
FIG. 3 is a block diagram of an inventive arrangement.

An exemplary block diagram of an inventive arrangement 500 for reducing the amount of messages sent in a communication network is shown in FIG. 3, wherein the arrangement 500 comprises means 510 for sending first protocol messages packed inside second protocol messages, i.e. piggybacked, each of said first and second protocol messages indicating a number of procedural steps and, means 520 for providing an instruction field with each of the first protocol messages determining at least one co-ordination rule to be used for said procedural steps, whereby said at least one co-ordination rule is selected from a set of pre-defined rule(s).

Figure 4:
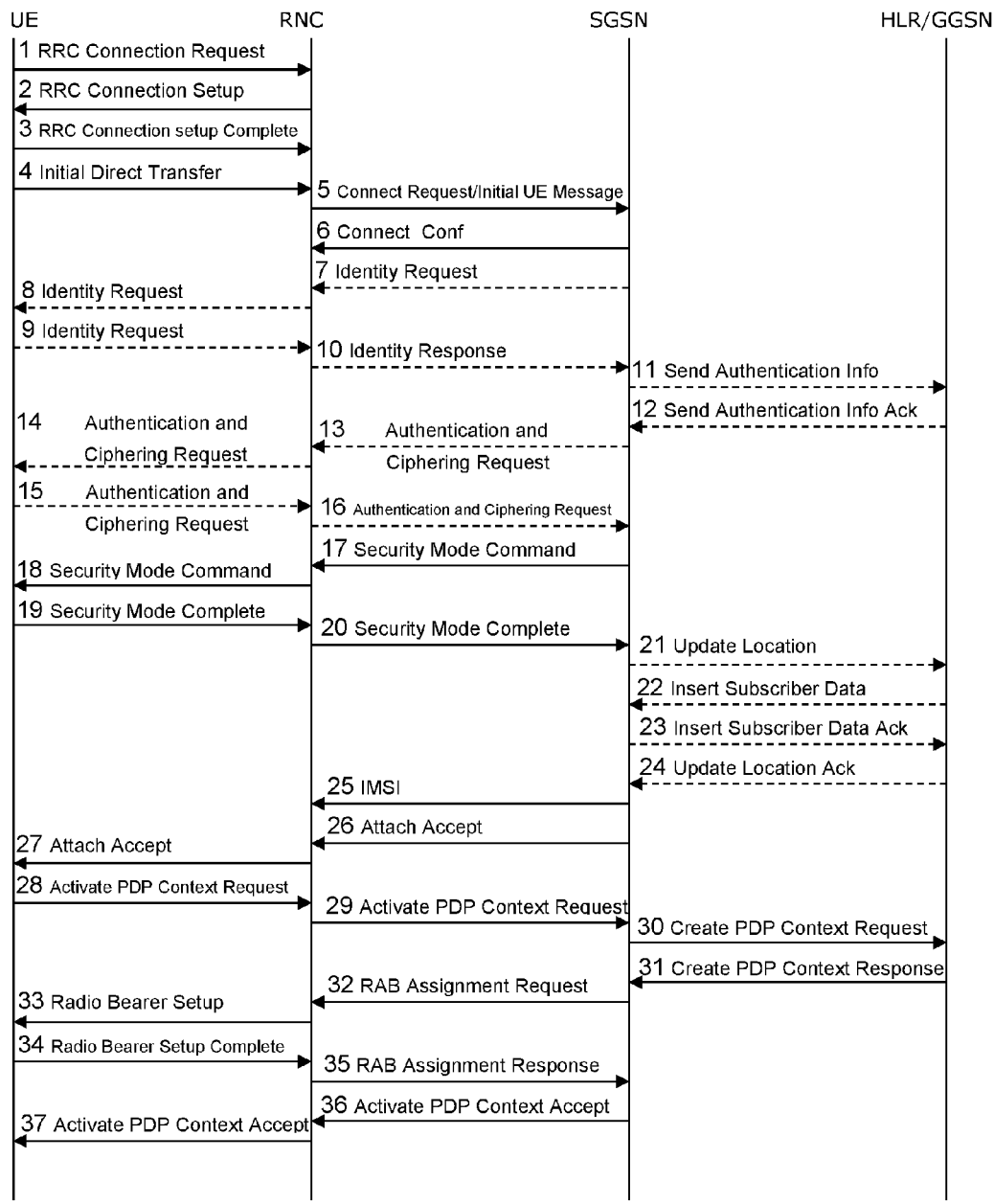
FIG. 4 illustrates a typical procedure for an action performed in the mobile communication network.

A typical UMTS prior art procedure for "service activation" is shown in FIG. 4. This procedure involves many messages exchanged over the radio interface and will in the following be briefly described:

1. RRC: RACH/CCCH RRC Connection Request;
2. RRC: FACH/CCCH RRC Connection Setup;
3. RRC: DCCH/DCH RRC Connection setup Complete
4. RRC: DCCH/DCH(AM) Initial Direct Transfer (Attach Request)
5. SCCP Connect Request (CR)
   RANAP Initial UE Message (Attach Request)
6. SCCP Connect Conf (CC)
7. RANAP Direct Transfer (Identity Request)
8. RRC: DCCH/DCH(AM) Downlink Direct Transfer (Identity Request)
9. RRC: DCCH/DCH(AM) Uplink Direct Transfer (Identity Request)
10. RANAP Direct transfer (Identity Response)
11. MAP Send Authentication Info
12. MAP Send Authentication Info Ack
13. RANAP Direct Transfer (Authentication and Ciphering Request)
14. RRC: DCCH/DCH(AM) Downlink Direct Transfer (Authentication and Ciphering Request)
15. RRC: DCCH/DCH(AM) Uplink Direct Transfer (Authentication and Ciphering Request)
16. RANAP Direct Transfer (Authentication and Ciphering Request)
17. RANAP Security Mode Command
18. RRC: DCCH/DCH(AM) Security Mode Command
19. RRC: DCCH/DCH(AM) Security Mode Complete
20. RANAP Security Mode Complete
21. MAP Update Location
22. MAP Insert Subscriber Data
23. MAP Insert Subscriber Data Ack 24. MAP Update Location Ack
25. RANAP Common ID (IMSI)
26. RANAP Direct Transfer (Attach Accept)
27. RRC: DCCH/FACH(AM) Downlink Direct Transfer (Attach Accept)
28. RRC: DCCH/DCH(AM) Uplink Direct Transfer (Activate PDP Context Request)
29. RANAP Direct Transfer (Activate PDP Context Request)
30. GTP_C Create PDP Context Request
31. GTP_C Create PDP Context Response
32. RANAP RAB Assignment Request
33. RRC: DCCH/DCH(AM) Radio Bearer Setup
34. RRC: DCCH/RACH(AM) Radio Bearer Setup Complete
35. RANAP RAB Assignment Response
36. RANAP Direct Transfer (Activate PDP Context Accept)
37. RRC: DCCH/FACH(AM) Downlink Direct Transfer (Activate PDP Context Accept)

As stated above in the background, all of these exchanged messages will cause significant delay to the execution and piggybacking, as one solution for enabling less hand-shaking, is in practice difficult to achieve.

The basic concept of the invention is to introduce general rules defining what type of co-ordination of the NAS and AS procedures invoked by the NAS and AS protocol messages respectively. The existence of these rules will make it possible to piggyback some of the NAS protocol messages over existing AS (RRC) messages and to use piggybacking between the nodes of the communication network implementing NAS and AS protocols. These rules will consequently enable the benefits of piggybacking.

In the preferred embodiment, the invention is used in an existing UMTS architecture. It is understood, however, that the invention also works in new architectures regardless of whether the NAS and AS protocols are implemented in a single node or multiple nodes.

The inventive solution is to ensure that together with each NAS protocol message piggybacked inside a AS protocol messages there is an instruction field included. This instruction field defines the co-ordination behaviour required from the UE. Below, some examples of instructions are listed. It should, however, be noted that the invention is not limited to these examples. The instructions will for instance indicate to the UE:
Whether or not the NAS and AS procedures can be started independently of each other, i.e. whether or not the UE needs to wait for:
the NAS procedure to be completed before starting the AS procedure.
the AS procedure to be completed before starting the NAS procedure.
Whether or not the AS procedure can be started regardless of the outcome of the NAS procedure, i.e. whether or not the UE shall only start
the AS procedure if the outcome of the NAS procedure is successful. (If "success is required" and the outcome of the NAS procedure is unsuccessful the AS procedure shall be considered as unsuccessful.)
the NAS procedure if the outcome of the AS procedure is successful. (If "success is required" and the outcome of the AS procedure is unsuccessful the NAS procedure shall be considered as unsuccessful.)

The above rules can be provided as a single instruction parameter or as a set of instruction parameters indicating, e.g., "waiting requirement" (Whether or not to wait for the NAS procedure before starting the AS procedure) and "outcome requirement" (Whether or not the outcome of the NAS procedure need to be successful to start the AS procedure separately.). Thus, the inventive method performs the following steps:
sending NAS protocol messages packed inside AS protocol messages (piggybacked);
providing an instruction field (instruction parameter) within each NAS protocol message, which instructs the receiver how the NAS and AS procedures (indicated in the protocol messages) should be co-ordinated, where this co-ordination is done according to one or more pre-defined rule(s). Which one(s) of these rules that is used is determined by the instruction parameter.

For architectures where the NAS and the AS protocols are implemented in different nodes, e.g. like in the UMTS architecture described above, the protocol between these two nodes (carrying the NAS protocol messages to the node implementing the AS protocol) need to include instructions to the node implementing the AS protocol how the instruction to the UE shall be given. These instructions will be the same as the ones above (AS protocol node→UE).

Figure 5:
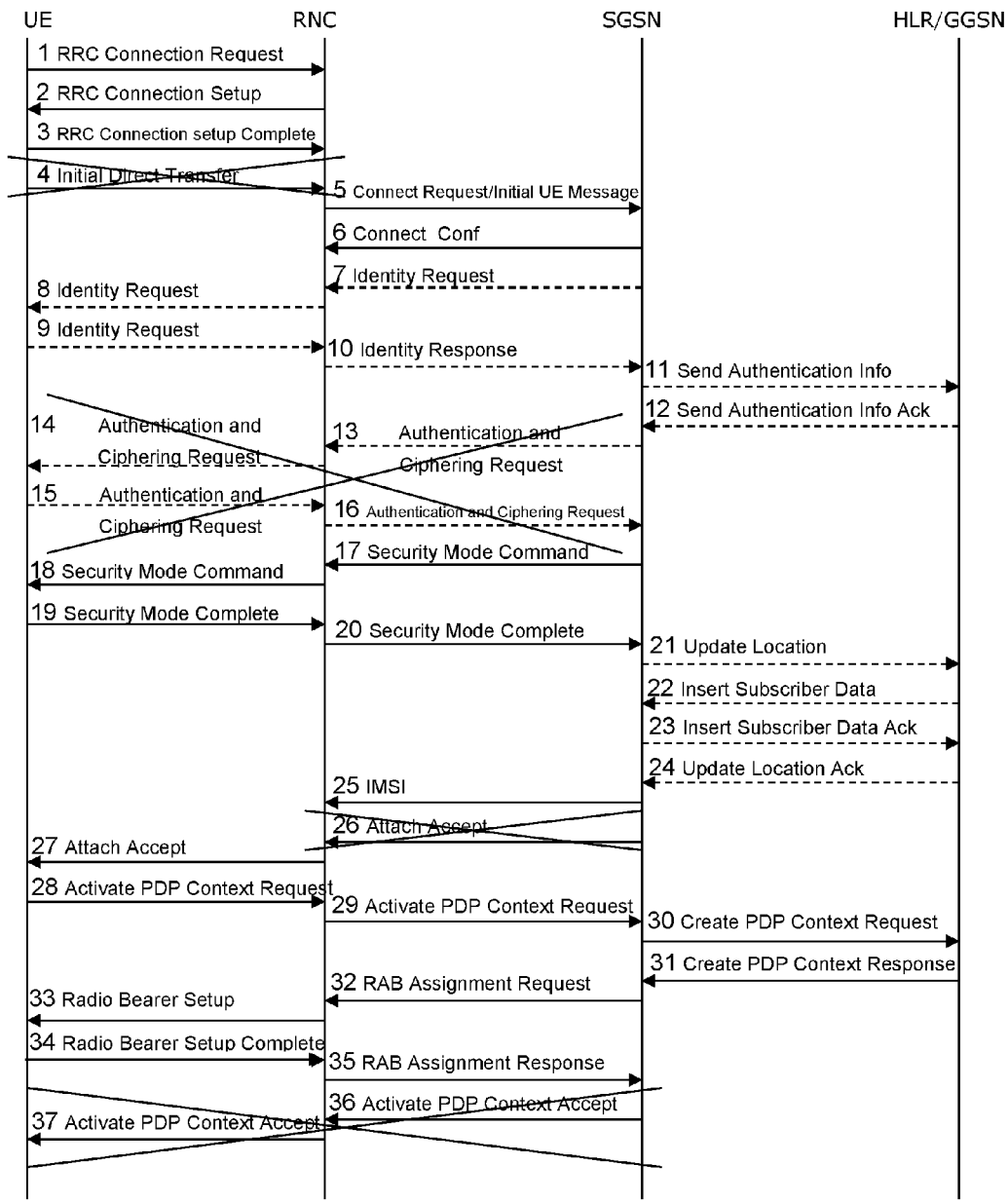
FIG. 5 illustrates the procedure shown in FIG. 4, but with the inventive method implemented.

With the above rules, e.g., the sequence shown in FIG. 5 would be enabled, where the rules could be the following:
17: Piggy-backing instruction to the RNC:
Provide the following piggy-backing instruction to the UE:
Wait for the NAS procedure to complete before starting AS procedure.
The outcome of the NAS procedure have to be successful to proceed with the AS procedure (otherwise the AS procedure shall be considered as failed).
18: Piggy-backing instruction to the UE:
Wait for the NAS procedure to complete before starting AS procedure.
The outcome of the NAS procedure have to be successful to proceed with the AS procedure (otherwise the AS procedure shall be considered as failed).
32: Piggy-backing instruction to the RNC:
Provide the following piggy-backing instruction to the UE:
Wait for the AS procedure to complete before starting NAS procedure.
The outcome of the AS procedure have to be successful to proceed with the NAS procedure (otherwise the NAS procedure shall be considered as failed).
33: Piggy-backing instruction to the UE:
Wait for the AS procedure to complete before starting NAS procedure.
The outcome of the AS procedure have to be successful to proceed with the NAS procedure (otherwise the NAS procedure shall be considered as failed).

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, according to a preferred embodiment of the present invention a computer-readable medium containing computer program for reducing the amount of messages sent in a communication network comprising a first communication network entity, such as the CN 200, a second communication network entity, such as the UTRAN 100, connected to said first communication network entity 200 over a communication interface, such as the Iu-interface or the S1-interface, and one or more user equipments 120 connected to said second communication network entity 100 over a radio interface, such as the Uu-interface or the new LTE radio interface, whereby messages are sent on said interfaces using at least a first and a second protocol, wherein the computer program performs the steps of:

sending first protocol messages packed inside second protocol messages (so called piggybacking), each of said first and second protocol messages indicating a number of procedural steps;

providing with each of said first protocol messages an instruction field determining at least one co-ordination rule to be used for said procedural steps, whereby said at least one co-ordination rule is selected from a set of pre-defined rule(s).

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method for reducing the amount of messages sent in a communication network comprising a first communication network entity, a second communication network entity connected to said first communication network entity over a communication interface and one or more user equipments connected to said second communication network entity over a radio interface, whereby messages are sent on said interfaces using at least a first and a second protocol, wherein the method comprises the steps of:

sending first protocol messages packed inside second protocol messages, wherein said first protocol is a non-access stratum protocol and said second protocol is an access stratum protocol, each of said first and second protocol messages indicating a number of procedural steps, each procedural step belonging to a procedure related to the first or second protocol; and, providing together with each of said first protocol messages an instruction field determining at least one co-ordination rule to be used for said procedural steps, wherein said at least one co-ordination rule is selected from a set of pre-defined rules, each of which indicates how a receiving one of said one or more user equipments is to co-ordinate a procedure related to the first protocol and a procedure related to the second protocol.

2. The method according to claim 1, wherein said pre-defined rules are provided as a single instruction parameter.

3. The method according to claim 1, wherein said pre-defined rules are provided as a set of instruction parameters.

4. The method according to claim 1, wherein said communication network is a code division multiple access network.

5. The method according to claim 1, wherein said first communication network entity is a core network and said second communication network entity is a radio access network.

6. The method according to claim 5, wherein said radio access network is a UMTS terrestrial radio access network.

7. The method according to claim 1, wherein said communication interface is the Iu-interface.

8. The method according to claim 1, wherein said communication interface is the S1-interface.

9. The method according to claim 1, wherein said radio interface is the Uu-interface.

10. The method according to claim 1, wherein said radio interface is a Long Term Evolution radio interface.

11. An arrangement for reducing the amount of messages sent in a communication network comprising a first communication network entity, a second communication network entity connected to said first communication network entity over a communication interface and one or more user equipments connected to said second communication network entity over a radio interface, whereby messages are sent on said interfaces using at least a first and a second protocol, wherein the arrangement comprises:

means for sending first protocol messages packed inside second protocol messages, wherein said first protocol is a non-access stratum protocol and said second protocol is an access stratum protocol, each of said first and second protocol messages indicating a number of procedural steps, each procedural step belonging to a procedure related to the first or second protocol; and, means for providing together with each of said first protocol messages an instruction field determining at least one co-ordination rule to be used for said procedural steps, wherein said at least one co-ordination rule is selected from a set of pre-defined rules, each of which indicates how a receiving one of said one or more user equipments is to co-ordinate a procedure related to the first protocol and a procedure related to the second protocol.

12. The arrangement according to claim 11, wherein the arrangement further comprises means for providing said pre-defined rules as a single instruction parameter.

13. The arrangement according to claim 11, wherein the arrangement further comprises means for providing said pre-defined rules as a set of instruction parameters.

14. The arrangement according to claim 11, wherein said communication network is a code division multiple access network.

15. The arrangement according to claim 11, wherein said first communication network entity is a core network and said second communication network entity is a radio access network.

16. A non-transitory computer-readable medium containing a computer program for reducing the amount of messages sent in a communication network comprising a first communication network entity, a second communication network entity connected to said first communication network entity over a communication interface and one or more user equipments connected to said second communication network entity over a radio interface, whereby messages are sent on said interfaces using at least a first and a second protocol, wherein the computer program performs the steps of:

sending first protocol messages packed inside second protocol messages, wherein said first protocol is a non-access stratum protocol and said second protocol is an access stratum protocol, each of said first and second protocol messages indicating a number of procedural steps, each procedural step belonging to a procedure related to the first or second protocol; and, providing together with each of said first protocol messages an instruction field determining at least one co-ordination rule to be used for said procedural steps, wherein said at least one co-ordination rule is selected from a set of pre-defined rules, each of which indicates how a receiving one of said one or more user equipments is to co-ordinate a procedure related to the first protocol and a procedure related to the second protocol.

* * * * *